United States Patent [19]

Nakamura et al.

[11] Patent Number: 4,929,822
[45] Date of Patent: May 29, 1990

[54] DETECTION SYSTEM WITH AN OPTICAL ENCODER TO OPTICALLY DETECT DISPLACEMENT AMOUNT OF A MOVABLE DEVICE

[75] Inventors: Nobuaki Nakamura; Yukimi Hirose, both of Fujieda; Masakatsu Kai; Makoto Itonaga, both of Yokahama, all of Japan

[73] Assignee: Victor Company of Japan, Ltd., Yokohama, Japan

[21] Appl. No.: 313,672

[22] Filed: Feb. 22, 1989

[30] Foreign Application Priority Data

| Feb. 22, 1988 | [JP] | Japan | 63-37630 |
| Feb. 22, 1988 | [JP] | Japan | 63-37631 |
| Feb. 22, 1988 | [JP] | Japan | 63-37632 |
| Mar. 17, 1988 | [JP] | Japan | 63-64369 |

[51] Int. Cl.$^5$ .............................. G01J 1/20
[52] U.S. Cl. ........................ 250/201.4; 369/45; 250/231.16
[58] Field of Search ................ 250/201, 231; 369/44-46

[56] References Cited

U.S. PATENT DOCUMENTS

| 4,769,801 | 9/1988 | Funada et al. | 369/45 |
| 4,774,698 | 9/1988 | Henmi et al. | 369/45 |

FOREIGN PATENT DOCUMENTS

| 57-62507 | 10/1982 | Japan . |
| 59-144517 | 9/1984 | Japan . |
| 59-188521 | 10/1984 | Japan . |
| 59-224514 | 12/1984 | Japan . |
| 60-100013 | 6/1985 | Japan . |
| 60-145311 | 9/1985 | Japan . |

Primary Examiner—David C. Nelms
Attorney, Agent, or Firm—Pollock, VandeSande & Priddy

[57] ABSTRACT

An optical detection system for detecting a displacement amount of a movement device with an optical encoder movable in accordance with a movement of the movable device has on a light-reflecting layer a plurality of pits successively strung in a predetermined direction. An optical pickup optically picks up the pit information by irradiating the optical encoder with light beams and receiving reflected light beams from the optical encoder. The optical pickup comprises a light-division device for dividing the light beam from a light-emitting device into three light beams so that the divided three light beams are directed to the pit string to apply three light spots to the pit string. The light-division device is adapted to be rotatable with respect to the optical encoder so that a light passing through the three light spots intersects the pit string at a predetermined angle. The reflected light beams due to the outside light spots are respectively incident on two photosensitive elements each generating an electrical signal. The electrical signals from the photosensitive elements, which are out-of-phase by an amount corresponding to the rotation of the light-division device, are fed to a detection circuit to detect information of the movement of the movable device and produce a pit detection signal indicative of the information.

19 Claims, 13 Drawing Sheets

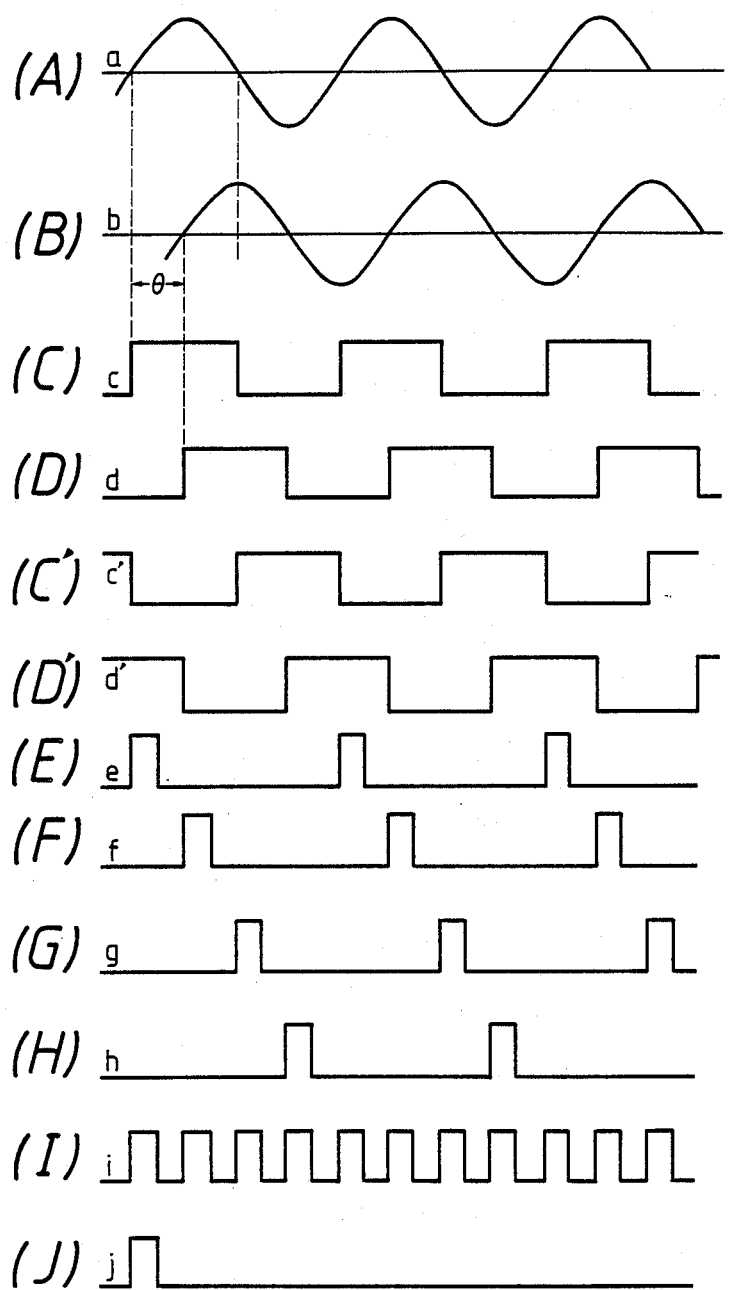

DETECTION SYSTEM WITH AN OPTICAL ENCODER TO OPTICALLY DETECT DISPLACEMENT AMOUNT OF A MOVABLE DEVICE

BACKGROUND OF THE INVENTION

The present invention relates to a detection system having an optical encoder to optically detect a displacement such as the rotational speed and rotational angular position of a movable device.

Rotation detecting system of the type of having an optical encoder to optically detect rotation, or rotational displacement, of a rotating device such as a motor and a rotating table is known. The optical encoder generally includes a disc-like member rotatable in accordance with rotation of the rotating device and having a plurality of slits formed circularly at an equal angular interval on the vicinity of its circumference. The rotatable disc-like member is interposed between a light-emitting device and a light-receiving device of an optical pickup apparatus so that light emitted from the light-emitting device is intermittently incident through the slits of the rotatable disc-like member onto the light-receiving device in response to rotation of the rotating device. The light-receiving device is adapted to successively generate an electrical signal with a level corresponding to the quantity of light incident thereon and the generated electrical signals are used to detect the rotational speed or rotational angle of the optical encoder and then to effect rotation control of the rotating device. One of the major requirements arising in rotation detecting systems is the improvement of detection accuracy. One possible solution is to increase the number of slits to be formed on the rotatable disc-like member to reduce the pitch between the slits. However, in such a conventional rotation detecting system, excessive increase in the number of the slits can reduce the quantity of light from the light-emitting device to the light-receiving device, resulting in making it difficult to detect the intermittent variation of light and thus providing design limitations imposed on the increase in the number of the slits to be formed in the optical encoder.

SUMMARY OF THE INVENTION

The present invention has been developed in order to remove the above-mentioned drawbacks inherent to conventional optical rotation detecting systems.

It is therefore an object of the present invention to provide an optical rotation detecting system which is capable of accurately detecting a rotation of a rotating device.

With this and other features which will become apparent as the description proceeds, an optical detection system for detecting a displacement amount of a movable device according to the present invention comprises: optical encoder means adapted to be movable in accordance with a movement of the movable device, the optical encoder being composed of at least a light-reflecting layer and having on the light-reflecting layer a plurality of pits formed in geometric convex or concave configuration and successively strung in a predetermined direction; optical pickup means disposed to be in opposed relation to the optical encoder means for optically picking up the pit information by irradiating the optical encoder with a light beam and by receiving a reflection light beam from the optical encoder means, the optical pickup means including: (a) a light-emitting device for emitting the light beam to the optical encoder means; (b) an optical device for introducing the light beam from the light-emitting device into the pit string to apply a light spot to the pit string; and (c) a photo detector composed of a plurality of photosensitive elements for receiving a light beam due to reflection of the light spot applied to the pit string, each of the photosensitive elements generating an electrical signal corresponding to the incident light beam thereon; focus control circuit means responsive to the electrical signals from the plurality of photosensitive elements of the photo detector and coupled to said optical device for controlling the optical device on the basis of the electrical signals therefrom so that the light beam from the light-emitting device is focused on the pit string of the optical encoder; and detection circuit means responsive to the electrical signals from the plurality of photosensitive elements thereof for detecting information of the movement of the movable device and producing a pit detection signal indicative of the information of the movement thereof, the detection circuit means including: (a) an adder for obtaining a sum signal of the electrical signals from the photosensitive elements; (b) a delay circuit connected to the adder to delay the sum signal by a predetermined amount so as to give a predetermined phase difference between the sum signal and the delayed sum signal; and (c) a pit-information generating circuit connected to the adder and the delay circuit so as to produce the pit detection signal on the basis of the sum signal from the adder and the delayed sum signal from the delay circuit.

In accordance with the present invention, there is further provided an optical detection system for detecting a displacement amount of a movable device, comprising: optical encoder means adapted to be movable in accordance with a movement of said movable device, said optical encoder being composed of at least a light-reflecting layer and having on said light-reflecting layer a plurality of pits formed in geometric convex or concave configuration and successively strung in a predetermined direction; optical pickup means disposed to be in opposed relation to said optical encoder means for optically picking up the pit information by irradiating said optical encoder with a light beam and by receiving a reflection light beam from said optical encoder means, said optical pickup means including: (a) a light-emitting device for emitting the light beam to said optical encoder means; (b) an optical device for introducing the light beam from said light-emitting device into the pit string to apply a light spot to the pit string; and (c) a photo detector composed of a plurality of photosensitive elements for receiving a light beam due to reflection of the light spot applied to the pit string, each of said photosensitive elements generating an electrical signal corresponding to the incident light beam thereon; focus control circuit means responsive to the electrical signals from said plurality of photosensitive elements of said photo detector and coupled to said optical device for controlling said optical device on the basis of the electrical signals therefrom so that the light beam from said light-emitting device is focused on the pit string of said optical encoder; and detection circuit means responsive to the electrical signals from said plurality of photosensitive elements thereof for detecting information of the movement of said movable device and producing a pit detection signal indicative of the information of the movement thereof, said detection circuit means including: (a) a first adder for obtaining a first sum signal of the electrical signals from said photosensitive elements; (b) a delay circuit connected to said first adder to delay said sum signal by a predetermined amount so as to produce a phase difference between said first sum signal and the delayed sum signal; (c) a first pulse-producing circuit connected to said first adder and said delay circuit so as to produce pulse signals on the basis of said first sum signal from said adder and the delayed sum signal from said delay circuit; (d) a second adder connected to said first adder and said delay circuit for obtaining a second sum signal of said first sum signal from said first adder and the delayed sum signal from said delay circuit; (e) a subtracter connected to said first adder and said delay circuit for obtaining a difference signal between said first sum signal from said first adder and the delayed sum signal from said delay circuit; (f) a second pulse-producing circuit connected to said second adder and said subtracter so as to produce pulse signals on the basis of said second sum signal from said second adder and said difference signal from said subtracter; and (g) an OR circuit responsive to said pulse signals from said first and second pulse-producing circuits so as to generate said pit detection signal.

In accordance with the present invention, there is further provided an optical detection system for detecting a displacement amount of a movable device, comprising: optical encoder means adapted to be movable in accordance with a movement of said movable device, said optical encoder being composed of at least a light-reflecting layer and having on said light-reflecting layer a plurality of pits formed in geometric convex or concave configuration and successively strung in a predetermined direction; optical pickup means disposed to be in opposed relation to said optical encoder means for optically picking up the pit information by irradiating said optical encoder with light beams and by receiving reflected light beams from said optical encoder means, said optical pickup means including: (a) a light-emitting device for emitting the light beam to said optical encoder means; (b) an optical device including light-division means for dividing the light beam from said light-emitting device into three light beams so that the divided three light beams are directed to the pit string to apply three light spots to the pit string, said three light spots being arranged at equal intervals so as to lay substantially in a straight line, said light-division means being adapted to be rotatable with respect to said optical encoder so that a light passing through said three light spots intersects the pit string at a predetermined angle; (c) a first photodetector composed of a plurality of photosensitive elements for receiving a light beam due to reflection of the central light spot of said three light spots applied to the pit string, each of said photosensitive elements generating an electrical signal corresponding to the incident light beam thereon; and (d) a second photodetector composed of two photosensitive elements for respectively receiving light beams due to reflections of the outside light spots of said three light spots applied to the pit string, each of said photosensitive elements generating an electrical signal corresponding to the incident light beam thereon, the phases of said electrical signals being different from each other by a value corresponding to the rotation amount of said light-division means; focus control circuit means responsive to the electrical signals from said plurality of photosensitive elements of said first photodetector and coupled to said optical device for controlling said optical device on the basis of the electrical signals therefrom so that the divided three light beams from said light-division means are focused on the pit string of said optical encoder; and detection circuit means responsive to said electrical signals from said two photosensitive elements thereof for detecting information of the movement of said movable device and producing a pit detection signal indicative of the information of the movement thereof on the basis of said electrical signals therefrom.

In accordance with the present invention, there is still further provided a method of manufacturing an optical linear encoder which is employed for an optical detection system for detecting a displacement amount of a movable device, the method comprising the steps of: (a) preparing a disc-like transparent base on which a photoresist is applied on its surface; (b) exposing said disc-like transparent base with a light beam with said transparent base being rotated about its own center, the diameter of said light beam being controlled to be stable so that the locus of said light beam has a predetermined width; (c) moving said light beam toward the center of said transparent base at a predetermined speed so that the locus of said light beam is formed spirally so as to have a predetermined pitch, said predetermined pitch being set to two times said predetermined width; (d) removing a portion of the spirally formed locus so as to form a spiral channel; (e) forming a light-reflecting film on the surface of said transparent base which has said spiral channel; (f) cutting off said transparent base along lines which pass through the center of said transparent base and extend radially at a predetermined angular interval so that the cut-off transparent base has a sectorial configuration; and (g) machining the sectorial transparent base so as to have a rectangular configuration whose longitudinal axis is coincident with the bisector of the sectorial transparent base.

BRIEF DESCRIPTION OF THE DRAWINGS

The object and features of the present invention will become more readily apparent from the following detailed description of the preferred embodiments taken in conjunction with the accompanying drawings in which:

FIG. 6 is a waveform diagram for describing operation of the FIG. 1 detecting system;

DETAILED DESCRIPTION OF THE INVENTION

Figure 1:
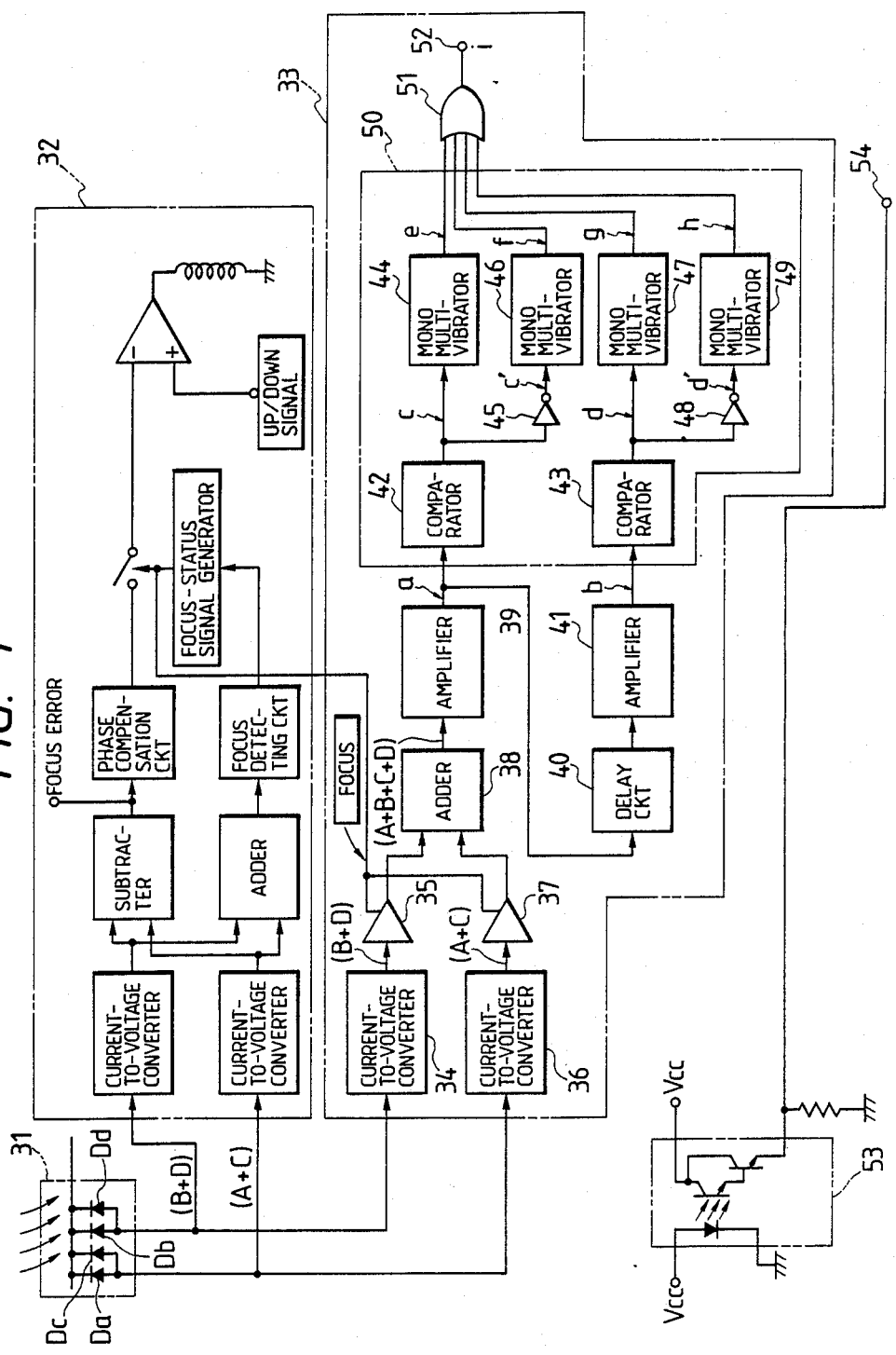
FIG. 1 is a block diagram showing a circuit arrangement of an optical detecting system according to an embodiment of the present invention.
Figure 2:
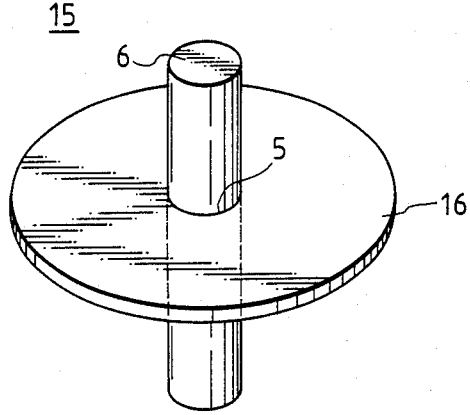
FIG. 2 is a perspective view showing an optical encoder which can be employed for optical detecting systems of this invention.
Figure 3:
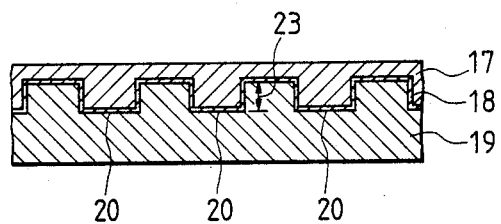
FIG. 3 is a cross-sectional view showing a portion of the FIG. 2 optical encoder.
Figure 5A:
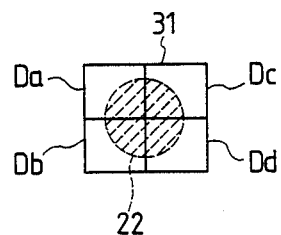
FIG. 5A is an illustration for describing the relation between photosensitive elements of an optical pickup device and a light spot.
Figure 5B:
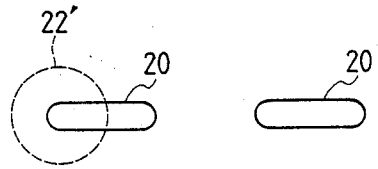
FIG. 5B is an illustration for describing the relation between a pit and a light spot.
Figure 4A:
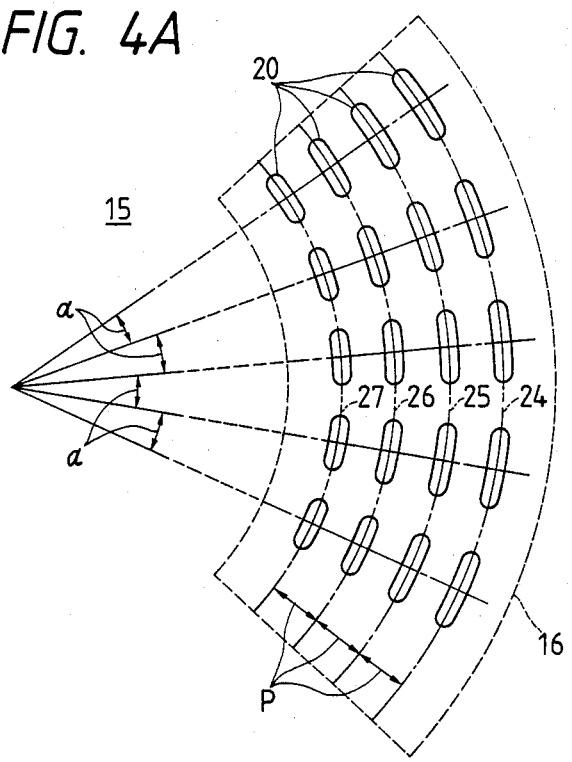
FIGS. 4A and 4B are illustrations of pits to be formed on the FIG. 2 optical encoder.
Figure 4B:
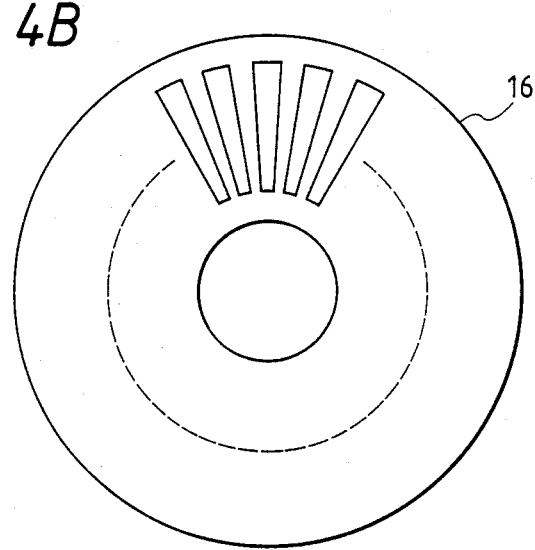

Referring now to FIG. 1, there is illustrated a circuit arrangement of an optical rotation detecting system according to a first embodiment of the present invention, the circuit arrangement being coupled to an optical pickup device 31 which is in turn associated with an optical encoder 15. The optical encoder 15, as shown in FIG. 2, comprises a disc-like plate 16 with a center hole 5 for inserting a shaft 6 thereinto which may in turn be connected to a rotating shaft of a rotating device, not shown, to be controlled on the basis of a detection signal of the optical rotation detecting apparatus of this embodiment. The disc-like plate 16 is rotatable in accordance with rotation of the rotating shaft of the rotating device and, as shown in FIG. 3, is composed of a guard film 17 made of an ultraviolet curing resin or the like, a reflection film 18 formed by means of the deposition or sputtering of a metal such as aluminium and a transparent base 19 made of a polycarbonate resin or the like, then being piled up in sequence to be closely adhered to each other so that the reflection film 18 is interposed between the guard film 17 and the transparent base 19. Illustrated at numeral 20 are pits which, as shown in FIG. 4A, are arranged circularly at equal angular intervals of $\alpha$ and at radial intervals of P along the circumference of the rotatable disc-like plate 16 so as to form a plurality of pit strings 24 to 27 to be in coaxial relation to each other, each of the pits being elongated in the circumferential directions Here, it is also appropriate to circularly arrange the pits 20 each of which extends radially, as shown in FIG. 4B. The rotatable disk-like plate 16 is disposed such that the transparent base 19 side thereof faces the optical pickup device 31. The optical pickup device 31 includes a light-emitting device such as a semiconductor laser (not shown) and a light-receiving device, i.e., a photo detector, responsive to light emitted from the light-emitting device. The photo detector, as shown in FIG. 5A, is composed of four photosensitive elements Da, Db, Dc, Dd, each being a photodiode or the like for generating an electric signal corresponding to the quantity of light incident thereupon. In FIG. 5A, numeral 22 represents a light spot formed on the photo detector due to light emitted from the semiconductor laser of the optical pickup device 31. The wavelength of a light beam emitted from the semiconductor laser is 0.78 $\mu$m, for example, and the light beam emitted therefrom reaches the rotatable disc-like plate 16 after being passed through an optical system such as a beam splitter (or semi-transparent mirror) of the optical pickup device 31 and then transmits the transparent base 19 to be focused to produce a microscopic light spot 22' on the pit 20 on the reflection film 18 of the rotatable disc-like plate 16 as shown in FIG. 5B. The diameter of the produced microscopic light spot is 1.5 $\mu$m, for example. Whereupon, a reflected light beam from the reflection film 18 is incident on the photo detector after again being passed through the same optical system of the optical pickup device 31 where the light spot 22 is essentially divided into four portions by means of the four photosensitive elements Da to Dd of the photo detector as shown in FIG. 5A. Here, the depth 23 (see FIG. 3) of each pit 20 is formed to be about $\frac{1}{4}$ of the wavelength of the light beam to be emitted from the semiconductor laser so that interference of the light beam occurs at a line of demarcation between the pit 20 and the other portion. This causes variation of the reflection amount of light on the reflection film 18 whereby the four photosensitive elements Da to Dd respectively generate four electric signals A, B, C and D corresponding to the pit 20.

Returning to FIG. 1, the output lines of the photosensitive elements Da and Dc are coupled to each other so as to produce a combined signal (A+C) and similarly the output lines of the photosensitive elements Db and Dd are connected to each other so as to produce a combined signal (B+C). The combined signals (A+C) and (B+D) are respectively supplied to a focus control section 32 and an encoder signal processing section 33. Generally, although these combined signals (A+C) and (B+D) are further supplied to a rotational direction detecting circuit for detecting a direction of rotation of the optical encoder 15 on the basis of the signals (A+C) and (B+D) and a rotation servo detecting circuit for keeping the rotation of the optical encoder 15 constant, these circuits are omitted from illustration. As is well known, the focus control section 32 is provided to control the focusing operation of the optical pickup device 31 with respect to the pit string of the optical encoder 15 with the difference between the combined signals (A+C) and (B+D) becoming zero, and comprises current-to-voltage converters, a subtracter, an adder, a phase compensating circuit, a focus detection circuit and an operational amplifier. The combined signals (A+C) and (B+D) supplied to the focus control section 32 are respectively led to current-to-voltage converters which are coupled to the subtracter and the adder, respectively. The subtracter is coupled to the phase compensating circuit which is in turn coupled to the operational amplifier and the adder is coupled to the focus detection circuit which is also coupled through a focus-status signal generator to the operational amplifier which control a focus actuator of the optical pickup device 31.

On the other hand, the combined signals (A+C) and (B+D) supplied to the encoder signal processing section 33 are respectively led to current-to-voltage converters 34, 36 and then to buffer circuits 35, 37 the output signals of which are respectively supplied to an adder 38 to produce an addition signal (A+B+C+D) which is a combination of the combined signals (A+C) and (B+D). The buffer circuits 35, 37 are coupled to the focus-status signal generator of the focus control section 32 to be responsive to a focus-status signal to operate when the optical pickup device 31 is in the focus state with respect to the pit of the optical encoder 15. This is for accurate signal processing. The output signal (A+B+C+D) of the adder 38 is supplied through an amplifier 39 to a comparator 42 and a delay circuit 40, respectively. The output signal of the delay circuit 40 is supplied through an amplifier 41 to another comparator 43. The output signal of the comparator 43 is supplied to a monostable multivibrator 47 and further supplied through an inverter 48 to a monostable multivibrator 49 which monostable multivibrators are in turn coupled to an OR circuit 51. On the other hand, the output signal of the comparator 42 is similarly supplied to a monostable multivibrator 44 and further supplied through an inverter 46 to a monostable multivibrator 45 which monostable multivibrators are also coupled to the OR circuit 51. The output signal of the OR circuit 51 is derived as an encoder output from an output terminal 52. Here, a pulse producing section 50 is made up of the comparators 42, 43, monostable multivibrators 44, 46, 47, 49, and inverters 45, 48.

More specifically, with reference to FIG. 6, the signals (A+C) and (B+D) supplied to the encoder signal processing section 33 are respectively converted into corresponding voltages by means of the current-to-voltage converters 34, 36 and then added to each other by the adder 38 to produce an addition signal (A+B+C+D) which is in turn amplified up to a predetermined level by the amplifier 39. The output signal of the amplifier 39 is indicated by character a in FIG. 1 and the waveform of the output signal thereof is illustrated in (A) of FIG. 6, the signal a will hereinafter be referred to as A-phase signal. This A-phase signal a is supplied to the delay circuit 40 to be delayed by a predetermined amount $\theta$ (radian) and then supplied to the amplifier 41 to be amplified up to a predetermined level to produce a signal b (see FIG. 1) which has a waveform as illustrated in (B) of FIG. 6 and which will hereinafter be referred to as B-phase signal. That is, the B-phase signal b lags the A-phase signal a by a phase difference of $\theta$.

The A-phase signal a and B-phase signal b are supplied to the comparators 42, 43, respectively, in order to shape the waveforms thereof to obtain rectangular signals c and d (see FIG. 1) illustrated in (C) and (D) in FIG. 6. Thereafter, the rectangular signals c and d are directly supplied to the monostable multivibrators 44, 47, respectively, and further supplied to the monostable multivibrators 46, 49, respectively, after being inverted by the inverters 45, 48 so as to generate rectangular signals c' and d' illustrated in (C') and (D') of FIG. 6. Each of the monostable multivibrators 44, 46, 47 and 49 is adapted to output one pulse e, f, g, or h at the rise timing of the inputted rectangular signal as shown in (E) to (H) of FIG. 6. These pulses e, f, g, or h are supplied to the OR circuit 51 to produce a pulse signal i illustrated in (I) of FIG. 6 as an encoder detection signal corresponding to a rotation such as rotational speed and rotational angle of the optical encoder 15. Here, if the delay amount $\theta$ is set to be ¼ of the period of the A-phase signal a, i.e., $\pi/2$ radian, the pulse signal i corresponds to the four-time division of the A-phase signal a.

In the case that the optical encoder 15 is an increment type encoder, a pit showing a zero address is required to be provided at the outer circumference or inner circumference of the rotatable disc-like plate 16. In FIG. 1, numeral 53 represents a detector for detecting the zero-address pit and the output signal (so-called Z-phase signal) of the detector 53, illustrated in (J) of FIG. 6, is outputted through an output terminal 54.

Second, a description will be given in terms of a second embodiment of this invention with reference to FIGS. 7 and 8. The difference between the circuit arrangement of FIG. 7 and the first embodiment is that there are further added a subtracter 55 for taking the difference between an A-phase signal a and a B-phase signal b respectively supplied from amplifiers 39 and 41, an adder 56 for taking the sum of the A-phase signal a and the B-phase signal b, calculation circuits 57, 58 for multiplying by $1/\sqrt{2}$ the output signals of the subtracter 55 and adder 56, respectively, a pulse producing section 50' having an arrangement identical with the pulse producing section 50 in FIG. 1, and an OR circuit 59 for, instead of the OR circuit 51 in FIG. 1, taking a logical sum of the output signals of the pulse producing section 50' and a pulse producing section 50 corresponding to the pulse producing section 50. Parts corresponding to those in FIG. 1 are marked with the same numerals and characters and the description thereof will be omitted for brevity.

Figure 8:
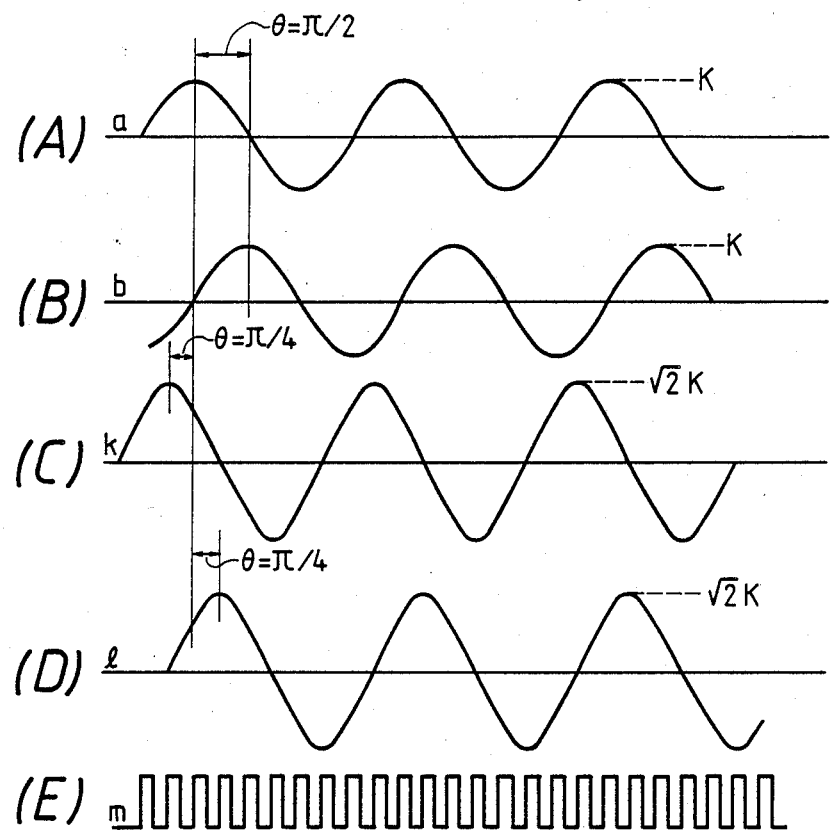
FIG. 8 is a waveform diagram for describing operation of the FIG. 7 detecting system.

Here, the delay amount $\theta$ of the delay circuit 40 is set to be $\theta = \pi/2$, and therefore the relation of the output signal a and b (A-phase signal and B-phase signal) of the amplifiers 39 and 41 are as illustrated in (A) and (B) in FIG. 8. The A-phase signal a and B-phase signal b are supplied to the pulse producing section 50 and further to the subtracter 55 and the adder 56, respectively. In receipt of the A-phase signal a and B-phase signal b, the subtracter 55 generates a signal k, illustrated in (C) of FIG. 8, whose phase is advanced by $\pi/4$ with respect to the A-phase signal a and whose level is $\sqrt{2}$ times as large as that of the A-phase signal a. On the other hand, in response to the A-phase signal a and B-phase signal b, the adder 56 generates a signal l, illustrated in (D) of FIG. 8, whose phase is delayed by $\pi/4$ with respect to the A-phase signal a and whose level is similarly $\sqrt{2}$ times as large as that of the A-phase signal a. The output signals k and l are multiplied by $1/\sqrt{2}$ in the calculation circuits 57, 58, respectively, so as to produce signals k' and l' (not shown) whose levels are equal to that of the A-phase signal a or B-phase signal b. The produced signals k' and l' are inputted to the pulse producing section 50' to output four signals which are in turn coupled to the OR circuit 59. Of the four output signals of the pulse producing section 50', one signal is a pulse whose phase is advanced by $\pi/4$ with respect to the A-phase signal a and the other three signals are pulses whose phases are respectively delayed by $\pi/4$, $3\pi/4$ and $5\pi/4$ with respect thereto. The OR circuit 59 is responsive to the output signals of the pulse producing sections 50 and 50' to produce a pulse signal m, illustrated in (E) of FIG. 8, which corresponds to eight-time division of the A-phase signal a.

According to the above-described first and second embodiments, since an encoder detection signal can be obtained using signals to be used in focus control of the optical encoder, the arrangement results in considerable simplicity.

Figure 7:
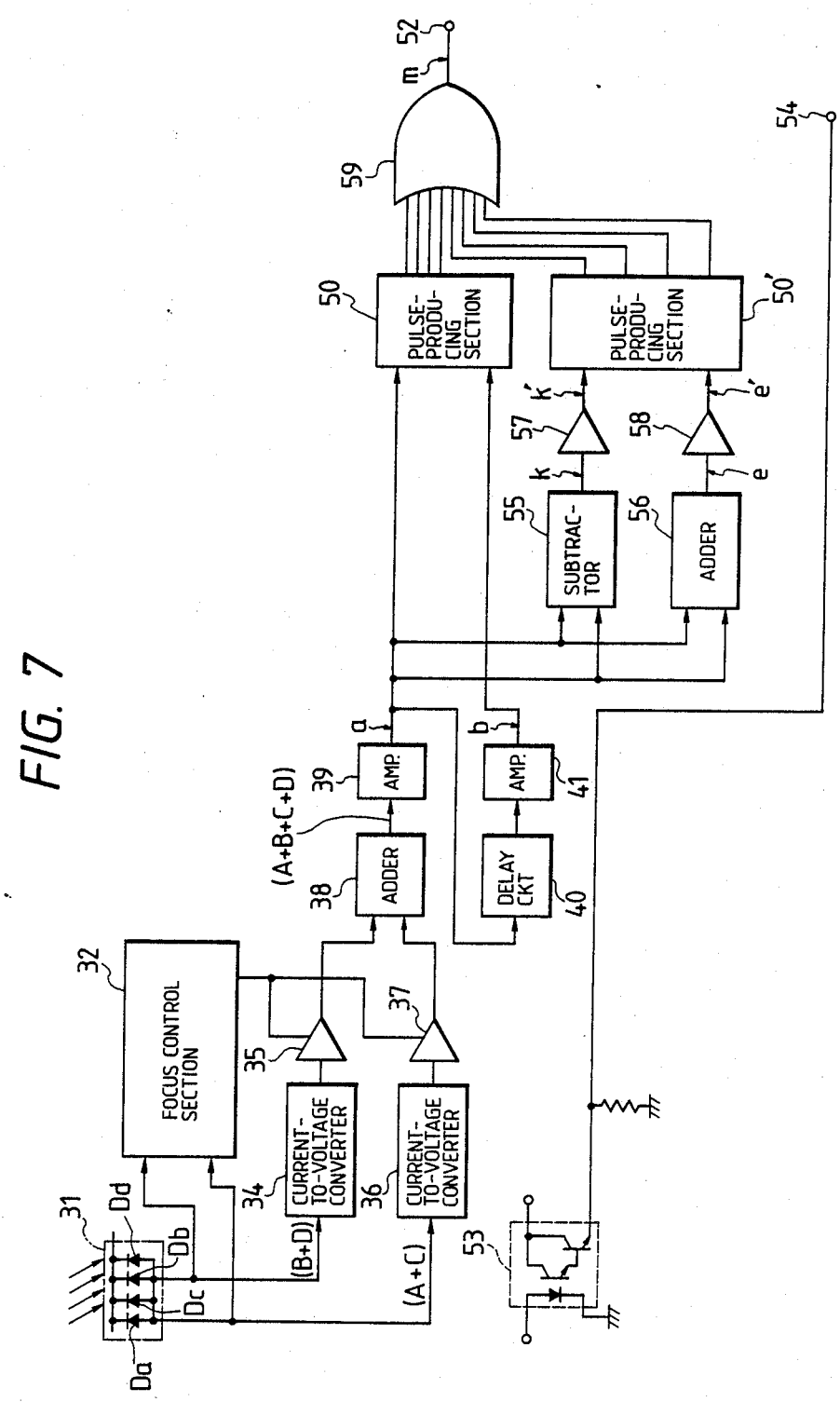
FIG. 7 is a block diagram showing a circuit arrangement of an optical detecting system according to another embodiment of this invention.
Figure 9:
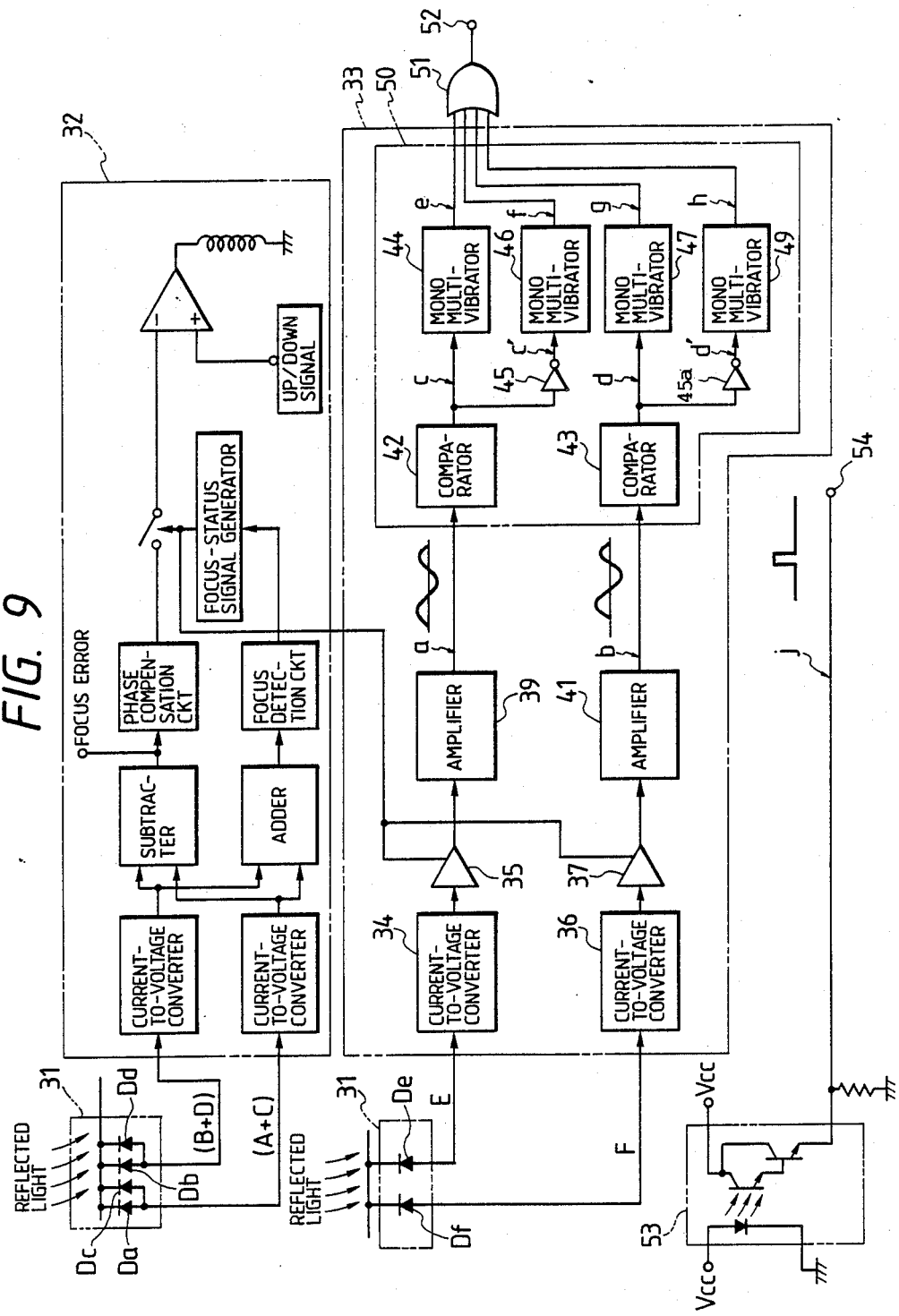
FIG. 9 is a block diagram showing a circuit arrangement of an optical detecting system according to a further embodiment of this invention.
Figure 10A:
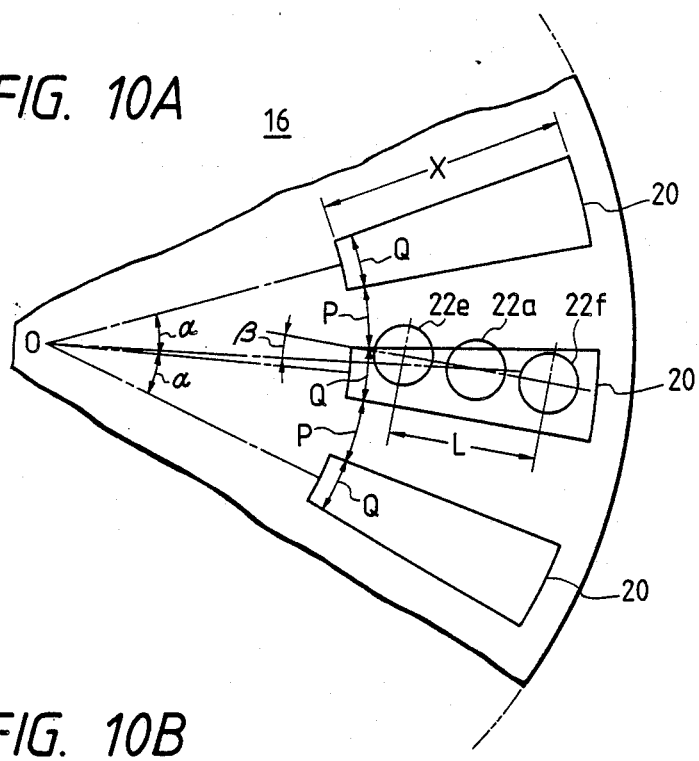
FIG. 10A is an illustration for describing an arrangement of pits and the relation between the pits and light spots.
Figure 10B:
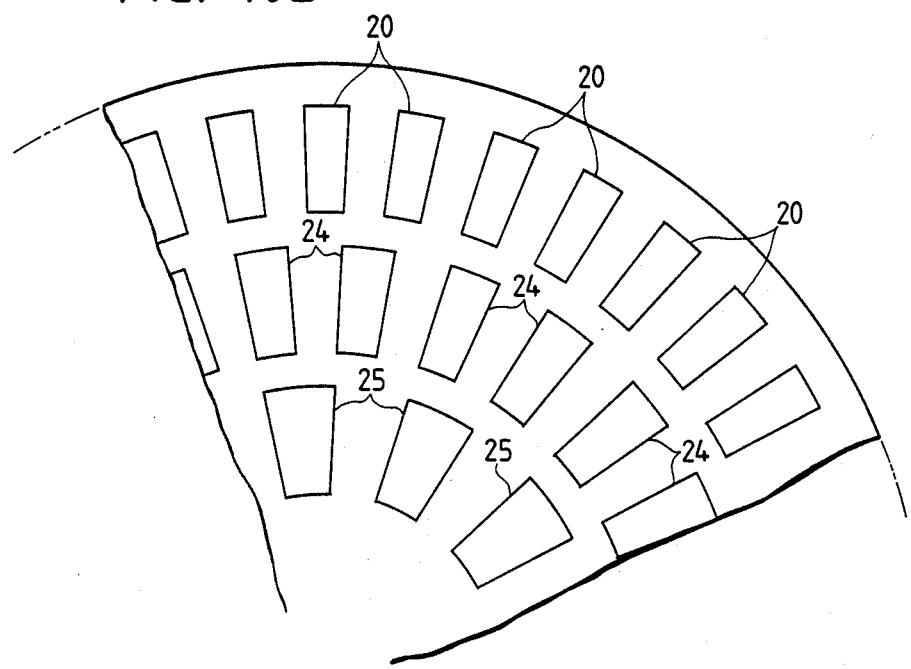
FIG. 10B shows an optical encoder having different pit strings.

FIG. 9 is an illustration of an arrangement of an optical rotation detecting system according to a third embodiment of the present invention, in which parts corresponding to those in FIG. 1 or FIG. 7 are marked with the same numerals and characters and the description thereof will be omitted for brevity. One difference between the optical rotation detecting system of FIG. 9 and the first embodiment of FIG. 1 is that the photo detector of an optical pickup device 31 is composed of two groups of photosensitive elements such as photodiodes, one group comprising photosensitive elements Da to Dd to produce four electric signals A to D due to incidence of a light spot thereon resulting from reflection of a light beam on a reflection film 18 of an optical encoder 15 as described in the first embodiment and the other group comprising photosensitive elements Df and De to produce two electric signals E, F in response to light spot incident thereon. The optical pickup device 31 further includes a division device such as a diffraction grating plate, not shown, to divide a light beam from a light-emitting device such as a semiconductor laser into three parts so as to irradiate first to third light spots 22a, 22e and 22f to the optical encoder 15 as shown in FIG. 10A. This is referred to as the three-spot method. The first to third light spots 22a, 22e and 22f are arranged at equal intervals so as to lay almost on a straight line. For example, the interval between the first to third light spots 22a, 22e, 22f is 16 $\mu$m and hence the distance L between the centers of the outer side light spots 22e and 22f is 32$\mu$m. The diameter of each of the light spots 22a, 22e, 22f formed on the reflection film 18 of the optical encoder 15 is about 1.5 to 1.7$\mu$m, for example. Here, as shown in FIG. 10A, pits 20 are successively arranged at equal angular intervals of $\alpha$ in the circumferential directions of the disc-like plate 16, each of the pits 20 being elongated radially to have a length (recording length) of X which will be determined taking into account the eccentric amount of the disc-like plate 16 on rotation. That is, the pit length X is determined to be sufficiently greater than the sum of two times the eccentric amount and the distance L between the centers of the outside pits 22e and 22f. Each of the pits 20 has a width of Q which is equal to the space P therebetween and therefore the pit pitch is two times the pit width Q, i.e., 2P. For example, Q or P is determined to be about 0.57 to 0.717$\mu$m. The pit length X is determined to be sufficiently great as compared with the distance L, for example, X being 1.6 millimeters. Here, it is also appropriate that the arrangement pattern of pits is formed as shown in FIG. 10B where strings of pits 24, 25 different from the string of the pits 20 in pit width Q and pit space P are additionally provided at different angular intervals on the disc-like plate 16 of the optical encoder 15. In this case, one of the pit strings may be selected in accordance with determination of a desirable encoder detection signal.

The diffraction grating plate of the optical pickup device 31 is adapted to be rotatable with respect to the optical encoder 15 so that the straight line drawn through the centers of the light spots 22e and 22f intersects the radially extending light passing through the center of the light spot 22a so as to make a predetermined mechanical angle $\beta$ therebetween as shown in FIG. 10A. A reflection light beam due to the light spot 22a is incident on the photosensitive elements Da to Dd to produce the electric signals A to D, whereas reflection light beams owing to the light spots 22e and 22f are respectively incident on the photosensitive elements De and Df to produce the electric signals E and F.

Figure 11:
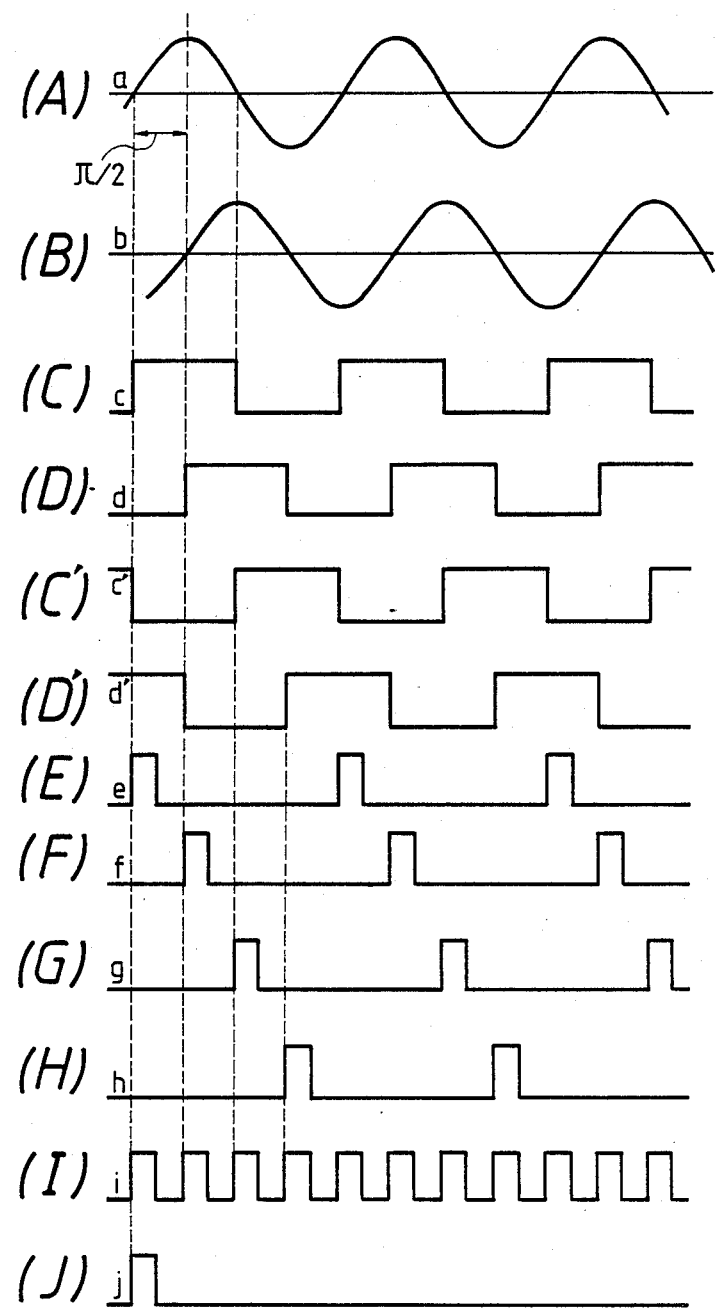
FIG. 11 is a waveform diagram for describing operation of the FIG. 9 optical detecting system.

Returning again to FIG. 9, the output signals A to D of the photosensitive elements Da to Dd of the optical pickup device 31 are supplied to a focus control section 32 which in turn controls focusing of the optical pickup device 31 with respect to a string of pits 20 of the optical encoder 15. Here, as well as in the first embodiment of FIG. 1, the output signals A, C and B, D are respectively combined so as to produce signals (A+C) and (B+D) before being supplied to the focus control section 32. On the other hand, the output signals E and F of the photosensitive elements De, Df are fed to an encoder signal processing section 33. The inputted output signals E, F initially reach current-to-voltage circuits 34, 36 which are in turn connected to buffer circuits 35, 37, respectively, which are adapted to be operable in response to a focus-status signal from the focus control section 32. The output signal of the buffer circuit 35 is fed to an amplifier 39 so as to produce an A-phase signal a illustrated in (A) of FIG. 11, while the output signal of the buffer circuit 37 is fed to another amplifier 41 so as to produce a B-phase signal b illustrated in (b) of FIG. 11. Here, unlike the first embodiment the output signal of the buffer circuit 37 is directly supplied to the amplifier 41 without passing through a delay circuit (40). The phase difference between the A-phase signal a and the B-phase signal b results in being $\pi/2$ radian in electrical angle with the rotation of the diffraction grating plate of the optical pickup device 31 by the predetermined mechanical angle. The A-phase signal a and the B-phase signal b are respectively supplied to comparators 42, 43 of a pulse producing section 50 which in turn produces rectangular signals c, d illustrated in (C) and (D) of FIG. 11. The output signal c of the comparator 42 is fed to a monostable multivibrator 44 and further to a monostable multivibrator 46 through an inverter 45. The inverter 45 inverts the output signal c thereof so as to generate a signal c' illustrated in (C') of FIG. 11. The output signal d of the comparator 43 is supplied to a monostable multivibrator 47 and further to a monostable multivibrator 49 after being passed through an inverter 45a. The inverter 46 inverts the output signal d thereof so as to generate a signal d' indicated by (D') of FIG. 11. Each of the monostable multivibrators 44, 46, 47 and 49 is adpated to generate one pulse at the rising timing of the corresponding input rectangular signal and the output signals e to h (illustrated in (E) to (H) of FIG. 11) of the respective monostable multivibrators 44, 46, 47 and 49 are inputted to an OR circuit 51 to produce a pulse signal i indicated by (I) of FIG. 11. The pulse signal i corresponds to a signal obtained by dividing the A-phase signal or B-phase signal into four. This four-division process consequently increases the encoder detection accuracy up to four times. In FIG. 11, a pulse signal j indicated by (J) is a Z-phase signal produced by a detector 53 in cases where the optical encoder 15 is of the increment type optical encoder, as described in the description of the first embodiment.

Thus, according to the above-mentioned third embodiment, since a light beam emitted from a light-emitting device is divided by means of a diffraction grating plate into three beams which are in turn focused on an optical encoder and the side light spots of the three light spots due to the three-divided beams are used for detection of rotation of the optical encoder, the adjustment of the phase difference between the A-phase signal and the B-phase signal can easily and securely be effected by rotation of the diffraction grating plate with respect to the optical encoder, thereby improving the rotation detection accuracy.

Figure 12:
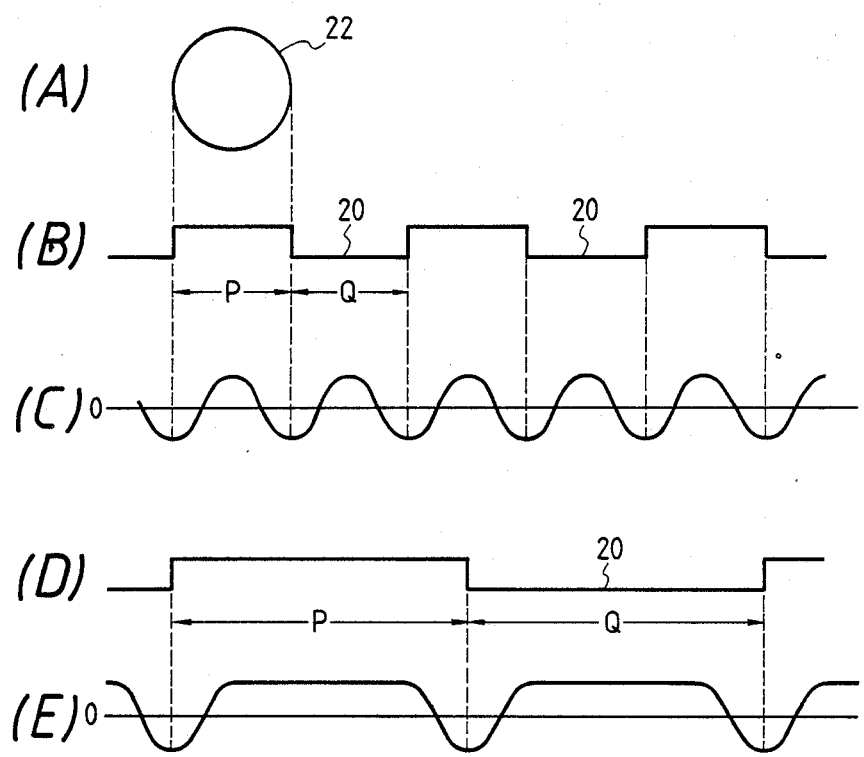
FIG. 12 is an illustration for describing the relation between a pit, a light spot and a detection signal.

FIG. 12 is an illustration of the relation between the light spot, pits and detection signals. In FIG. 12, (A) to (C) show the case of the third embodiment, (A) illustrates one of the light spots 22a, 22e, 22f, (B) illustrates the cross-section of the disc-like plate 16 of the optical encoder 15 and (C) illustrates an electric signal resulting from formation of the light spot 22 (one of spots 22a, 22e and 22f) on the pit 20. Since in the third embodiment the pit width Q and the pit space P are arranged to be equal to each other on the same circumference and substantially equal to the diameter of the light spot 22 as illustrated in (B) of FIG. 12, the electric signal is produced so as to have a waveform in which the wave-height difference is small and polarity variation in one cycle is symmetrical, and to have a frequency corresponding to two times the number of pits 20 successively arranged on the same circumference, as shown in (C) of FIG. 12. In cases where the pit width Q is equal to or greater than the diameter of the light spot 22, the detection signal has a frequency corresponding to two times the number of the pits 20 arranged on the same circumference. Whereas, if the pit width Q or pit space P is considerably greater in dimension as compared with the light spot 22 as shown in (D) of FIG. 12, an electric signal to be detected has a waveform in which the wave height from peak to peak is small and the polarity variation in one cycle is not symmetrical, as illustrated in (E) of FIG. 12.

Figure 13:
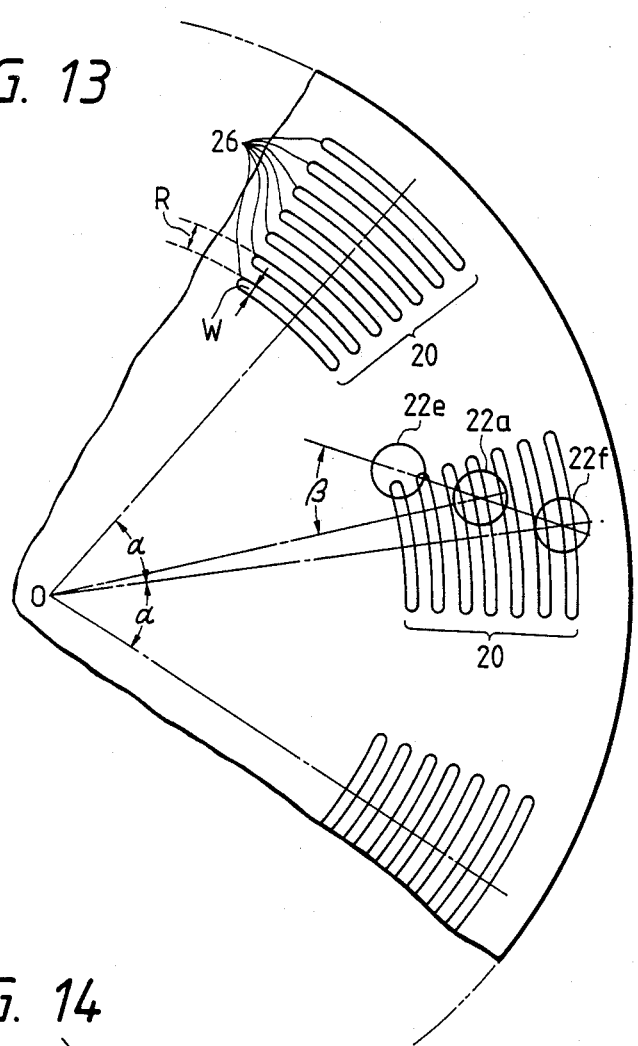
FIG. 13 is an illustration of a pattern of pits to be formed on the optical encoder of the optical detecting system of this invention.

FIG. 13 is an illustration for describing an elimination of the above-mentioned disadvantage (difficulty of obtaining a symmetrical waveform) and shows pits 20 formed on the disc-like plate 16 of the optical encoder 15, each comprising a plurality of pit segments 26 each of which has an arc-configuration and which may be arranged radially at equal intervals. The width W of each of the pit segments 26 is determined to be sufficiently small as compared with the diameter of the light spots 22a, 22e and 22f. The pit width W whereby the level of an electric signal to be obtained becomes at a maximum is generally known to be expressed as $\lambda/(3NA)$ where $\lambda$ is the wave length of light emitted from a light source to be used and NA is the numerical aperture of the optical pickup device, i.e., objective lens. Thus, when the wave length $\lambda$ is 0.78$\mu$m and the numerical aperture NA is 0.47, the pit width W is about 0.5 $\mu$m. In addition to the determination of the pit width W, it is required to determine the pitch R of the pit segments 26 so as to minimize the level variation of an electric signal to be obtained. According to an experiment and simulation, it has been found that the pitch R is preferred to be about 1$\mu$m. Concurrently, it is preferred to satisfy the conditions that the pit width W is greater than $0.25\lambda/NA$ and smaller than $0.35\lambda/NA$, and the pitch R is larger than $0.4\lambda/NA$ and smaller than $0.7\lambda/NA$.

With the above-mentioned arrangement, a maximum output can be obtained and the polarity variation becomes symmetrical.

Figure 14:
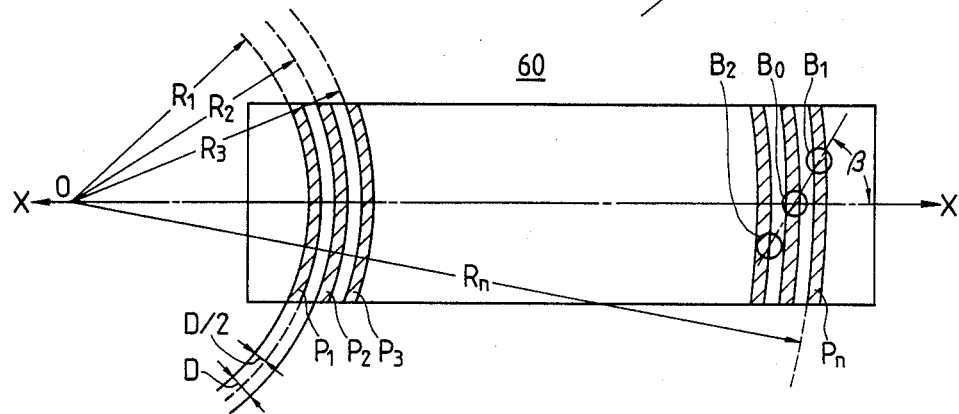
FIG. 14 illustrates an optical linear encoder which can be employed for the optical detecting system of this invention.

Although in the above description the detection systems of this invention are for optically detecting a rotation of a rotating device with a rotary encoder, it is also appropriate to use the above-mentioned embodiments as a linear position detection system for optically detecting a linear displacement of a movable device with a linear encoder. FIG. 14 is a plan view showing a pit pattern of an optical linear encoder 60 which can be employed for the above-mentioned embodiments in order to optically detect a linear displacement of a movable device. In FIG. 14, the linear encoder 60 has therein a plurality of pits P1 to Pn which are arranged along the longitudinal axis or center line X-X of the linear encoder 60 at a predetermined pitch of D. In the pit arrangement, an important feature is that the plurality of pits P1 to Pn are coaxially formed with different radii R1 to Rn with respect to a point 0 on the longitudinal axis X-X and the width of each of the pits 20 is formed to be D/2. Here, it can be considered that the lengths of the pits P1 to Pn are substantially equal to each other when the width l of the linear encoder 60 is relatively small.

Figure 15:
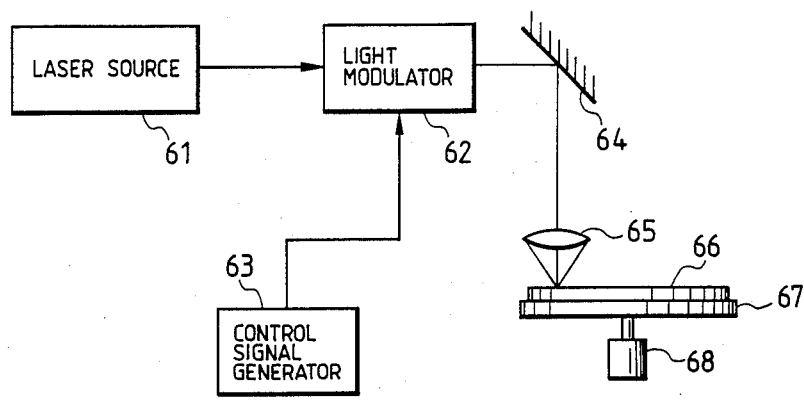
FIG. 15 is a block diagram showing an optical apparatus used for manufacturing the FIG. 14 optical linear encoder.
Figure 16A:
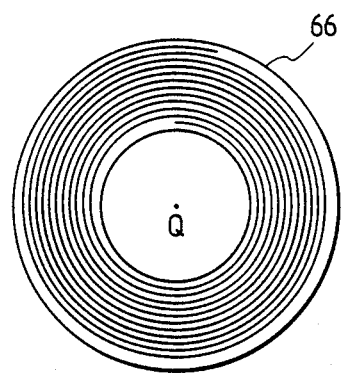
FIGS. 16A to 16D are illustrations for describing a manufacturing method of the FIG. 14 optical linear encoder.
Figure 16C:
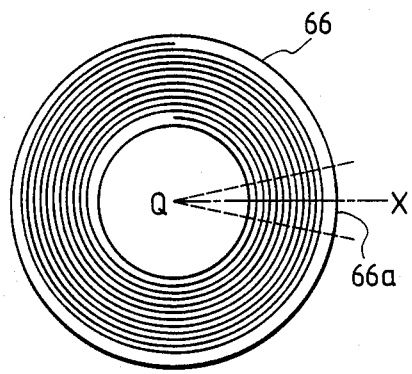
Figure 16B:
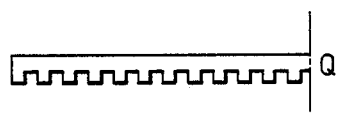
Figure 16D:
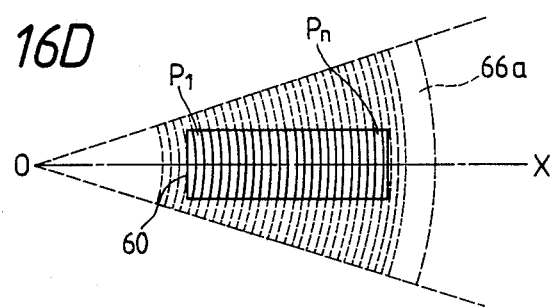

FIG. 15 is a block diagram showing one example of an apparatus to be used to manufacture the linear encoder 60. In FIG. 15, illustrated at numeral 61 is a laser light source which emits a laser beam. The laser beam is introduced into a light modulator 62 which is arranged to modulate the introduced laser beam in accordance with a control signal from a control signal generating circuit 63. The laser beam modulated in the light modulator 62 illuminates a master disc 66 through an objective lens 65 after being reflected by a mirror 64 so as to expose a photoresist, which is applied on the master disc 66, in correspondance with the control signal from the control signal generating circuit 63. At this time, the objective lens 65 is controlled by means of a focus servo system, not shown, so that the diameter of a light spot formed on the master disc 66 becomes constant, and a motor 68 is also controlled so that the rotational speed of the master disc 66 placed on a turntable 67 becomes constant so that the width of the locus of the light spot stably becomes D/2. Furthermore, the objective lens 65 and the mirror 64 are controlled to be moved in the center of the master disc 66 so that the locus of the exposure by the light spot is formed spirally with a pitch of D. FIG. 16A shows the master disc 66 with the spiral exposure locus. The locus portion is removed by a known development technique to thereby produce a portion corresponding to a transparent base 19 of the optical encoder as shown in FIG. 16B. Whereupon, a reflection film made of aluminium or the like is formed thereon by means of the vacuum deposition technique, for example, and a guard film is closely adhered onto the reflection film. The resultant master disc 66 is cut along dotted lines (passing through the center of the master disc 66 and extending radially) in FIG. 16C so as to take off a plurality of sectorial portions 66a. Each of the cut-out sectorial portions 66a, as shown in FIG. 16D, is machined so as to make the optical linear encoder 60 with the pits P1 to Pn which are substantially arranged coaxially with respect to a point 0 corresponding to the center of the master disc 66. At this time, the sectorial portion 66a is machined so that the bisector thereof is coincident with the longitudinal center line of the linear encoder 60. This encoder producing method makes easy formation of pits and allows mass production of the optical linear encoders 60.

Figure 17:
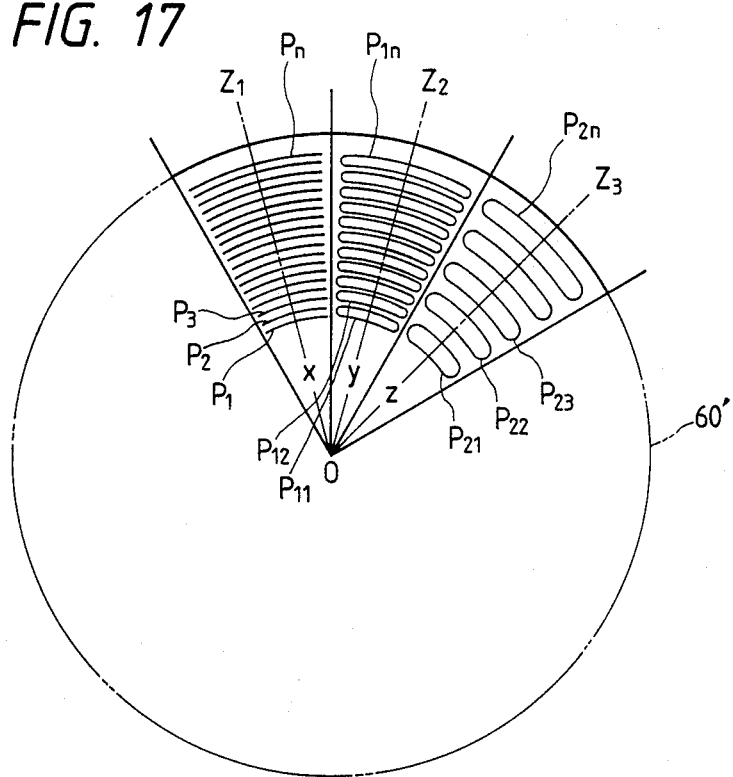
FIG. 17 shows a rotatable type optical linear encoder.

FIG. 17 shows a rotatable type optical linear encoder 60' which may be producible using the FIG. 15 apparatus. In FIG. 17, the optical linear encoder 60' is produced in a disc-like configuration or shape and has thereon a plurality of pit strings P1 to Pn, P11 to P1n, P21 to P2n radially arranged in different angular ranges x, y, z. The pits P1 to Pn, P11 to P1n or P21 to P2n in the same angular range x, y or z are successively lined up at equal intervals with respect to the bisector Z1, Z2 or Z3, and the pit width and the pit space in the same angular range are equal in dimension to each other, whereas the pit width and the pit space are changed at every angular range. These pit strings can be formed by intermittent illumination of a laser beam under control of the light modulator 62 of the FIG. 15 apparatus.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An optical detection system for detecting a displacement amount of a movable device, comprising:
    optical encoder means adapted to be movable in accordance with a movement of said movable device, said optical encoder being composed of at least a light-reflecting layer and having on said light-reflecting layer a plurality of pits formed in geometric convex or concave configuration and successively strung in a predetermined direction;
    optical pickup means disposed in opposed relation to said optical encoder means for optical picking up the pit information by irradiating said optical encoder with a light beam and by receiving a reflection light beam from said optical encoder means, said optical pickup means including:
    (a) a light-emitting device for emitting the light beam to said optical encoder means;
    (b) an optical device for introducing the light beam from said light-emitting device into the pit string to apply a light spot to the pit string; and
    (c) a photodetector having a plurality of photosensitive elements for receiving a light beam due to reflection of the light spot applied to the pit string, each of said photosensitive elements generating an electrical signal corresponding to the incident light beam thereon;
    focus control circuit means responsive to the electrical signals from said plurality of photosensitive elements of said photo detector and coupled to said optical device for controlling said optical device on the basis of the electrical signals therefrom so that the light beam from said light-emitting device is focused on the pit string of said optical encoder; and detection circuit means responsive to the electrical signals from said plurality of photosensitive elements thereof for detecting information of the movement of said movable device and producing a pit detection signal indicative of the information of the movement thereof, said detection circuit means including:
    (a) an adder for obtaining a sum signal of the electrical signals from said photosensitive elements;
    (b) a delay circuit connected to said adder to delay said sum signal by a predetermined amount so as to give a predetermined phase difference between said sum signal and the delayed sum signal; and (c) a pit-information generating circuit connected to said adder and said delay circuit so as to produce said pit detection signal on the basis of said sum signal from said adder and the delayed sum signal from said delay circuit.

2. An optical detection system as claimed in claim 1, wherein said focus control circuit means includes a focus-signal generator for generating a focus-status signal indicative of completion of the focusing operation of said optical device, and said detection circuit means is coupled to said focus-signal generator to produce said pit detection signal on the receipt of said focus-status signal.

3. An optical detection system as claimed in claim 1, wherein said optical encoder is of a linear type that has a rectangular configuration and in which said plurality of pits have different arc-configurations and are successively arranged at a predetermined pitch to be coaxial with respect to a point on a line passing through the longitudinal axis of said rectangular linear encoder, said plurality of pits being substantially equal to each other in length, and when the predetermined pit pitch is D, the width of each of said plurality of pits being D/2.

4. An optical detection system as claimed in claim 1, wherein said optical encoder is of a linear type that has a disc-like configuration and in which said plurality of pits are arranged radially so as to form pit strings at different angular intervals, the pits of each of said pit strings being coaxial with the center of said disc-like linear encoder and the pit width and pit pitch being different at every pit string.

5. An optical detection system for detecting a displacement amount of a movable device, comprising:
    optical encoder means adapted to be movable in accordance with a movement of said movable device, said optical encoder having at least a light-reflecting layer and having on said light-reflecting layer a plurality of pits formed in geometric convex or concave configuration and successively strung in a predetermined direction;
    optical pickup means disposed in opposed relation to said optical encoder means for optically picking up the pit information by irradiating said optical encoder with a light beam and by receiving a reflection light beam from said optical encoder means, said optical pickup means including:
    (a) a light-emitting device for emitting the light beam to said optical encoder means;
    (b) an optical device for introducing the light beam from said light-emitting device into the pit string to apply a light spot to the pit string; and
    (c) a photodectector having a plurality of photosensitive elements for receiving a light beam due to reflection of the light spot applied to the pit string, each of said photosensitive elements generating an electrical signal corresponding to the incident light beam thereon;
    focus control circuit means responsive to the electrical signals from said plurality of photosensitive elements of said photo detector and coupled to said optical device for controlling said optical device on the basis of the electrical signals therefrom so that the light beam from said light-emitting device is focused on the pit string of said optical encoder; and
    detection circuit means responsive to the electrical signals from said plurality of photosensitive elements thereof for detecting information of the movement of said movable device and producing a pit detection signal indicative of the information of the movement thereof, said detection circuit means including:
    (a) a first adder for obtaining a first sum signal of the electrical signals from said photosensitive elements;
    (b) a delay circuit connected to said first adder to delay said sum signal by a predetermined amount so as to produce a phase difference between said first sum signal and the delayed sum signal;

(c) a first pulse-producing circuit connected to said first adder and said delay circuit so as to produce pulse signals on the basis of said first sum signal from said adder and the delayed sum signal from said delay circuit;

(d) a second adder connected to said first adder and said delay circuit for obtaining a second sum signal of said first sum signal from said first adder and the delayed sum signal from said delay circuit;

(e) a subtracter connected to said first adder and said delay circuit for obtaining a difference signal between said first sum signal from said first adder and the delayed sum signal from said delay circuit;

(f) a second pulse-producing circuit connected to said second adder and said subtracter so as to produce pulse signals on the basis of said second sum signal from said second adder and said difference signal from said subtracter; and (g) an OR circuit responsive to said pulse signals from said first and second pulse-producing circuits so as to generate said pit detection signal.

6. An optical detection system as claimed in claim 5, wherein said focus control circuit means includes a focus-signal generator for generating a focus-status signal indicative of completion of the focusing operation of said optical device, and said detection circuit means is coupled to said focus-signal generator to produce said pit detection signal on the receipt of said focus-status signal.

7. An optical detection system as claimed in claim 5, wherein said optical encoder is of a linear type that has a rectangular configuration and in which said plurality of pits have different arc-configurations and are successively arranged at a predetermined pitch to be coaxial with respect to a point on a line passing through the longitudinal axis of said rectangular linear encoder, said plurality of pits being substantially equal to each other in length, and when the predetermined pit pitch is D, the width of each of said plurality of pits being D/2.

8. An optical detection system as claimed in claim 5, wherein said optical encoder is of a linear type that has a disc-like configuration and in which said plurality of pits are arranged radially so as to form pit strings at different angular intervals, the pits of each of said pit strings being coaxial with the center of said disc-like linear encoder and the pit width and pit pitch being different at every pit string.

9. An optical detection system for detecting a displacement amount of a movable device, comprising:
optical encoder means adapted to be movable in accordance with a movement of said movable device, said optical encoder having at least a light-reflecting layer and having on said light-reflecting layer a plurality of pits formed in geometric convex or concave configuration and successively strung in a predetermined direction;
optical pickup means disposed in opposed relation to said optical encoder means for optically picking up the pit information by irradiating said optical encoder with light beams and by receiving reflected light beams from said optical encoder means, said optical pickup means including:
(a) a light-emitting device for emitting the light beam to said optical encoder means;
(b) an optical device including light-division means for dividing the light beam from said light-emitting device into three light beams so that the divided three light beams are directed to the pit string to apply three light spots to the pit string, said three light spots being arranged at equal intervals so as to lay substantially in a straight line, said light-division means being adapted to be rotatable with respect to said optical encoder so that a light passing through said three light spots intersects the pit string at a predetermined angle;
(c) a first photodetector having a plurality of photosensitive elements for receiving a light beam due to reflection of the central light spot of said three light spots applied to the pit string, each of said photosensitive elements generating an electrical signal corresponding to the incident light beam thereon; and
(d) a second photodetector having two photosensitive elements for respectively receiving light beams due to reflections of the outside light spots of said three light spots applied to the pit string, each of said photosensitive elements generating an electrical signal corresponding to the incident light beam thereon, the phases of said electrical signals being different from each other by a value corresponding to the rotation amount of said light-division means;
focus control circuit means responsive to the electrical signals from said plurality of photosensitive elements of said first photodetector and coupled to said optical device for controlling said optical device on the basis of the electrical signals therefrom so that the divided three light beams from said light-division means are focused on the pit string of said optical encoder; and
detection circuit means responsive to said electrical signals from said two photosensitive elements thereof for detecting information of the movement of said movable device and producing a pit detection signal indicative of the information of the movement thereof on the basis of said electrical signals therefrom.

10. An optical detection system as claimed in claim 9, wherein said focus control circuit means includes a focus-signal generator for generating a focus-status signal indicative of completion of the focusing operation of said optical device, and said detection circuit means is coupled to said focus-signal generator to produce said pit detection signal on the receipt of said focus-status signal.

11. An optical detection system as claimed in claim 9, wherein said optical encoder has a disc-like configuration and said plurality of pits, are successively arranged in directions of the circumference of said disc-like optical encoder at equal angular intervals with respect to the center of said disc-like optical encoder, the width of each of said pits and the space between said pits being equal in dimension to each other.

12. An optical detection system as claimed in claim 9, wherein said light-division means is constructed of a diffraction grating plate.

13. An optical detection system as claimed in claim 9, wherein the phase difference between said electrical signals from said two photosensitive elements of said second photo detector is $\pi/2$ radian in electrical phase difference angle.

14. An optical detection system as claimed in claim 11, wherein each of said plurality of pits is formed such that its radial length is sufficiently greater than its circumferential width and the distance between the outside light spots.

15. An optical detection system as claimed in claim 14, wherein the width of each of said plurality of pits is equal to or greater than the diameter of each of said three light spots.

16. An optical detection system as claimed in claim 9, wherein said optical encoder has a disc-like configuration and said plurality of pits is successively arranged in directions of the circumference of said disc-like optical encoder so as to form a plurality of pit strings which are coaxial with respect to the center of said disc-like optical encoder, each of the pits being formed to be elongated radially and the radial length thereof being sufficiently greater than the circumferential width thereof, and the pits of each of said plurality of pit strings being strung at equal angular intervals and the widths of the pits and the spaces between the pits being respectively equal in dimension to each other, the pit's width and the angular interval being different at every pit string.

17. An optical detection system as claimed in claim 9, wherein said optical encoder has a disc-like configuration and each of said plurality of pits comprises a plurality of pit segments elongated in directions of the circumference of said optical encoder, when the wavelength of the light emitted from said light-emitting device is $\lambda$ and the numerical aperture of said optical device is NA, the radial width of each of said plurality of pit segments is greater than $0.25\lambda/NA$ and smaller than $0.35\lambda/NA$ and the pitch of said plurality of pit segments is greater than $0.4\lambda/NA$ and smaller than $0.7\lambda/NA$.

18. An optical detection system as claimed in claim 9, wherein said optical encoder is of a linear type that has a rectangular configuration and in which said plurality of pits have different arc-configurations and are successively arranged at a predetermined pitch to be coaxial with respect to a point on a line passing through the longitudinal axis of said rectangular linear encoder, said plurality of pits being substantially equal to each other in length, and when the predetermined pit pitch is D, the width of each of said plurality of pits being D/2.

19. An optical detection system as claimed in claim 9, wherein said optical encoder is of a linear type that has a disc-like configuration and in which said plurality of pits is arranged radially so as to form pit strings at different angular intervals, the pits of each of said pit strings being coaxial with the center of said disc-like linear encoder and the pit width and pit pitch being different at every pit string.

* * * * *